(12) United States Patent
Lee

(10) Patent No.: US 11,689,104 B2
(45) Date of Patent: Jun. 27, 2023

(54) VOLTAGE CONVERTER AND DISPLAY DEVICE INCLUDING THE SAME

(71) Applicant: SAMSUNG DISPLAY CO., LTD., Yongin-si (KR)

(72) Inventor: Yoon Young Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/745,129

(22) Filed: May 16, 2022

(65) Prior Publication Data

US 2023/0066237 A1  Mar. 2, 2023

(30) Foreign Application Priority Data

Aug. 24, 2021 (KR) .......................... 10-2021-0111916

(51) Int. Cl.
*G09G 3/30* (2006.01)
*H02M 3/158* (2006.01)
*H02M 1/00* (2006.01)

(52) U.S. Cl.
CPC .............. *H02M 3/158* (2013.01); *G09G 3/30* (2013.01); *H02M 1/0009* (2021.05); *G09G 2330/028* (2013.01)

(58) Field of Classification Search
CPC ...... H02M 3/158; H02M 1/0009; G09G 3/30; G09G 2330/028
See application file for complete search history.

(56) References Cited

U.S. PATENT DOCUMENTS

| 9,514,671 | B2 | 12/2016 | Park |
| 10,431,147 | B2* | 10/2019 | Park .......................... G09G 3/30 |
| 2008/0225563 | A1* | 9/2008 | Seo .......................... H02M 3/156 363/123 |
| 2011/0221482 | A1* | 9/2011 | Kim .................... H03K 17/6871 327/109 |
| 2013/0002639 | A1* | 1/2013 | Park ...................... G09G 3/3225 345/212 |
| 2018/0174517 | A1* | 6/2018 | Lee ........................ G09G 3/3291 |
| 2018/0233078 | A1* | 8/2018 | Park ........................ H02M 1/36 |

(Continued)

FOREIGN PATENT DOCUMENTS

| KR | 10-2018-0094206 | 8/2018 |
| KR | 10-2019-0047455 | 5/2019 |

*Primary Examiner* — Ibrahim A Khan
(74) *Attorney, Agent, or Firm* — F. Chau & Associates, LLC

(57) ABSTRACT

An embodiment of the present disclosure provides a voltage converter including: an inductor in which a first electrode thereof receives an input voltage and a second electrode thereof is connected to a first node; a first transistor in which a first electrode thereof is connected to the first node and a second electrode thereof is connected to a second node providing an output voltage; a second transistor in which a first electrode thereof is connected to the first node and a second electrode thereof is connected to a reference terminal; and a current sensor connected to the first node and the second node, wherein the current sensor includes: a third transistor in which a first electrode thereof is connected to the first node and a second electrode thereof is connected to a third node; and a current mirror circuit that mirrors currents flowing through the second node, the third node, and a sensing terminal.

20 Claims, 19 Drawing Sheets

(56) References Cited

U.S. PATENT DOCUMENTS

2020/0067300 A1\* 2/2020 Wang .................... G09G 3/2096
2020/0175906 A1\* 6/2020 Lee .......................... G09G 3/20
2021/0281175 A1\* 9/2021 Han ..................... G09G 3/3233

\* cited by examiner

VOLTAGE CONVERTER AND DISPLAY DEVICE INCLUDING THE SAME

CROSS-REFERENCE

This application claims priority under 35 U.S.C. sec. 119 to and the benefit of Korean Patent Application No. 10-2021-0111916 filed in the Korean Intellectual Property Office on Aug. 24, 2021, the entire contents of which are incorporated by reference herein.

FIELD

The present invention relates to a voltage converter and a display device including the same.

DISCUSSION

As information technology has developed, the importance of a display device, which may provide a connection medium between a user and information, has increased. Accordingly, the use of display devices such as a liquid crystal display device, an organic light-emitting display device and the like, has been increasing.

A display device displays an image by using a plurality of pixels. In this case, the plurality of pixels may receive a driving current from a power source to which they are commonly connected. When a current path of some pixels is in a short-circuit or like state, an overcurrent may flow from the power source such that a burn or like phenomenon may occur.

A sensing resistor may be used to sense this overcurrent. However, additional power may be consumed by the sensing resistor.

SUMMARY

The present disclosure provides a voltage converter and a display device including the same that may sense an overcurrent without a sensing resistor and may be substantially unaffected by external temperature changes.

An embodiment of the present disclosure provides a voltage converter including: an inductor in which a first electrode thereof receives an input voltage and a second electrode thereof is connected to a first node; a first transistor in which a first electrode thereof is connected to the first node and a second electrode thereof is connected to a second node providing an output voltage; a second transistor in which a first electrode thereof is connected to the first node and a second electrode thereof is connected to a reference terminal; and a current sensor connected to the first node and the second node, wherein the current sensor includes: a third transistor in which a first electrode thereof is connected to the first node and a second electrode thereof is connected to a third node; and a current mirror circuit that mirrors currents flowing through the second node, the third node, and a sensing terminal.

An area occupied by the third transistor may be smaller than an area occupied by the first transistor.

A gate electrode of the third transistor may be connected to the reference terminal.

The current mirror circuit may include: a fourth transistor in which a first electrode thereof is connected to the second node, a second electrode thereof is connected to a fourth node, and a gate electrode thereof is connected to the third node; a fifth transistor in which a first electrode thereof is connected to the third node, a second electrode thereof is connected to the fourth node, and a gate electrode thereof is connected to the third node; and a sixth transistor in which a first electrode thereof is connected to the sensing terminal, a second electrode thereof is connected to the fourth node, and a gate electrode thereof is connected to the third node.

The voltage converter may include an auxiliary circuit connecting the second electrode of the third transistor to the third node and connecting the second node to a fifth node, wherein the current mirror circuit mirrors a current flowing between the third node and a fourth node, a current flowing between the fifth node and the fourth node, and a current flowing between the sensing terminal and the fourth node.

An embodiment of the present disclosure provides a voltage converter including: an inductor in which a first electrode thereof receives an input voltage and a second electrode thereof is connected to a first node; a first transistor in which a first electrode thereof is connected to the first node and a second electrode thereof is connected to a second node providing an output voltage; a second transistor in which a first electrode thereof is connected to the first node and a second electrode thereof is connected to a reference terminal; and a first current sensor connected to the first node and the second node, wherein the current sensor includes: a third transistor including a first electrode connected to the first node and a second electrode; a current mirror circuit that mirrors a current flowing between a third node and a fourth node, a current flowing between a fifth node and the fourth node, and a current flowing between a sensing terminal and the fourth node; and an auxiliary circuit connecting the second node and the fifth node and connecting the second electrode of the third transistor to the third node.

An area occupied by the third transistor may be smaller than an area occupied by the first transistor.

A gate electrode of the third transistor may be connected to the reference terminal.

The current mirror circuit may include: a fourth transistor in which a first electrode thereof is connected to the fifth node, a second electrode thereof is connected to the fourth node, and a gate electrode thereof is connected to the third node; a fifth transistor in which a first electrode thereof is connected to the third node, a second electrode thereof is connected to the fourth node, and a gate electrode thereof is connected to the third node; and a sixth transistor in which a first electrode thereof is connected to the sensing terminal, a second electrode thereof is connected to the fourth node, and a gate electrode thereof is connected to the third node.

The auxiliary circuit may include: a seventh transistor in which a first electrode thereof is connected to the second node, a second electrode thereof is connected to the fifth node, and a gate electrode thereof is connected to the fifth node; and an eighth transistor in which a first electrode thereof is connected to the second electrode of the third transistor, a second electrode thereof is connected to the third node, and a gate electrode thereof is connected to the fifth node.

The voltage converter may further include a ninth transistor connected to the first transistor in parallel; and a tenth transistor connected to the second transistor in parallel.

An area occupied by the ninth transistor may be smaller than an area occupied by the first transistor, and an area occupied by the tenth transistor may be smaller than an area occupied by the second transistor.

The voltage converter may further include a multiplexer receiving a plurality of shut-down voltage levels and outputting one of the plurality of shut-down voltage levels as a reference voltage level; a comparator that receives the reference voltage level through a first input terminal thereof and receives a sensing voltage corresponding to a current of the sensing terminal through a second input terminal thereof; and a counter that provides a shut-down signal when an output of the comparator is within an effective output range for a predetermined time or more.

An embodiment of the present disclosure provides a display device including: pixels commonly connected to a first power line; a first voltage converter in which an output terminal thereof is connected to the first power line; and a second voltage converter in which an output terminal thereof is connected to the first power line, wherein when a first power current flowing through the first power line is less than a reference current, the first voltage converter individually generates the first power current, and when the first power current is larger than the reference current, the first voltage converter and the second voltage converter jointly generate the first power current.

The first voltage converter may include: an inductor in which a first electrode thereof receives an input voltage and a second electrode thereof is connected to a first node; a first transistor in which a first electrode thereof is connected to the first node and a second electrode thereof is connected to a second node providing an output voltage; a second transistor in which a first electrode thereof is connected to the first node and a second electrode thereof is connected to a reference terminal; and a current sensor connected to the first node and the second node, and the current sensor may include: a third transistor in which a first electrode thereof is connected to the first node and a second electrode thereof is connected to a third node; and a current mirror circuit that mirrors currents flowing through the second node, the third node, and a sensing terminal.

An area occupied by the third transistor may be smaller than an area occupied by the first transistor.

A gate electrode of the third transistor may be connected to the reference terminal, and the current mirror circuit may include: a fourth transistor in which a first electrode thereof is connected to the second node, a second electrode thereof is connected to a fourth node, and a gate electrode thereof is connected to the third node; a fifth transistor in which a first electrode thereof is connected to the third node, a second electrode thereof is connected to the fourth node, and a gate electrode thereof is connected to the third node; and a sixth transistor in which a first electrode thereof is connected to the sensing terminal, a second electrode thereof is connected to the fourth node, and a gate electrode thereof is connected to the third node.

The first voltage converter may include: an inductor in which a first electrode thereof receives an input voltage and a second electrode thereof is connected to a first node; a first transistor in which a first electrode thereof is connected to the first node and a second electrode thereof is connected to a second node providing an output voltage; a second transistor in which a first electrode thereof is connected to the first node and a second electrode thereof is connected to a reference terminal; and a first current sensor connected to the first node and the second node, and the current sensor may include: a third transistor including a first electrode connected to the first node and a second electrode; a current mirror circuit that mirrors a current flowing between a third node and a fourth node, a current flowing between a fifth node and the fourth node, and a current flowing between a sensing terminal and the fourth node; and an auxiliary circuit connecting the second node and the fifth node and connecting the second electrode of the third transistor to the third node.

An area occupied by the third transistor may be smaller than an area occupied by the first transistor.

A gate electrode of the third transistor may be connected to the reference terminal, and the current mirror circuit may include: a fourth transistor in which a first electrode thereof is connected to the fifth node, a second electrode thereof is connected to the fourth node, and a gate electrode thereof is connected to the third node; a fifth transistor in which a first electrode thereof is connected to the third node, a second electrode thereof is connected to the fourth node, and a gate electrode thereof is connected to the third node; and a sixth transistor in which a first electrode thereof is connected to the sensing terminal, a second electrode thereof is connected to the fourth node, and a gate electrode thereof is connected to the third node.

The auxiliary circuit may include: a seventh transistor in which a first electrode thereof is connected to the second node, a second electrode thereof is connected to the fifth node, and a gate electrode thereof is connected to the fifth node; and an eighth transistor in which a first electrode thereof is connected to the second electrode of the third transistor, a second electrode thereof is connected to the third node, and a gate electrode thereof is connected to the fifth node.

According to embodiments of a voltage converter and a display device including the same as provided in the present disclosure, it is possible to sense an overcurrent without a sensing resistor and to be substantially unaffected by external temperature changes.

DETAILED DESCRIPTION

Figure 1:
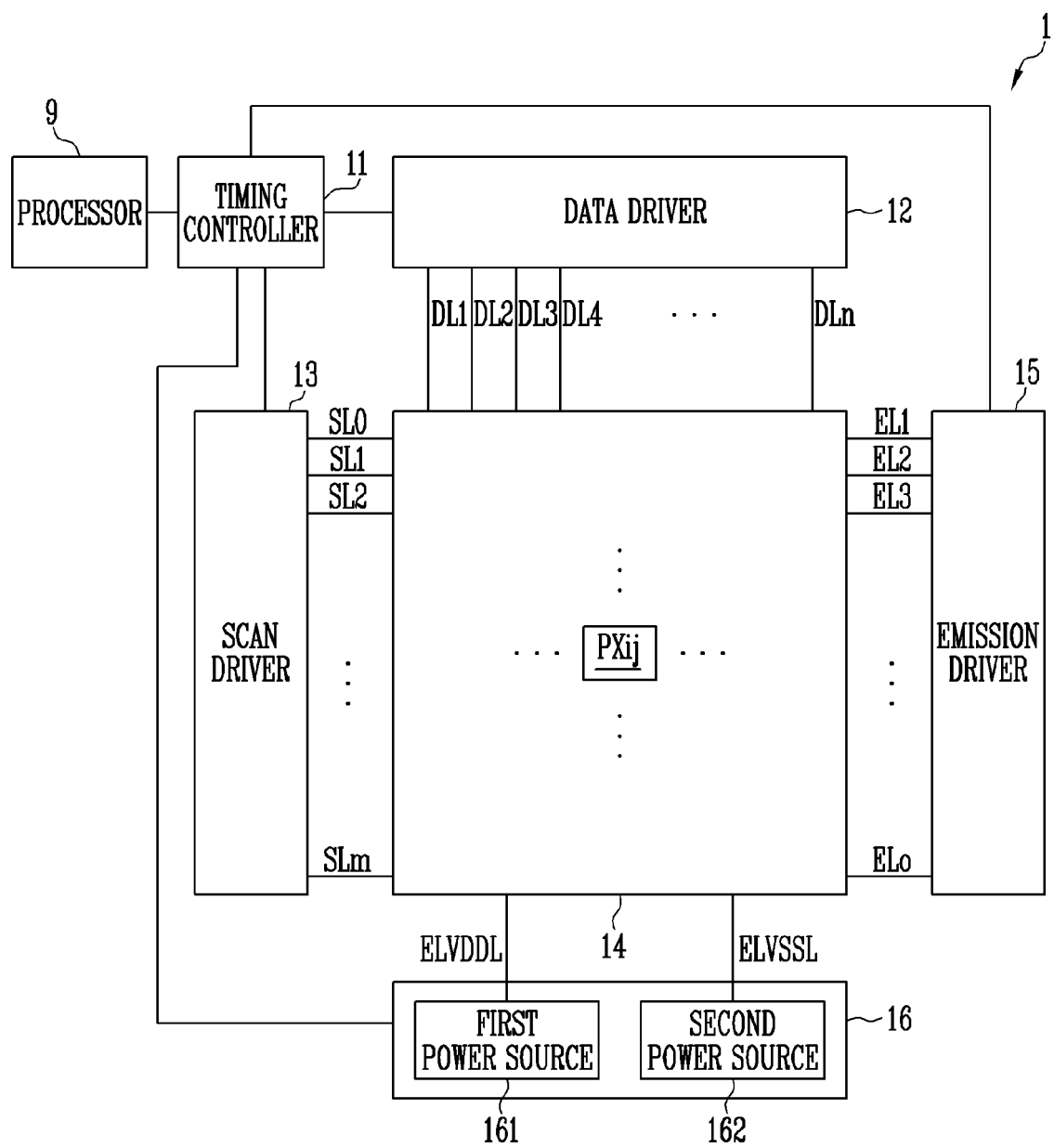
FIG. 1 is a block diagram for explaining a display device according to an embodiment of the present disclosure.

The present disclosure will be described more fully hereinafter with reference to the accompanying drawings, in which embodiments of the disclosure are shown. As those skilled in the art would realize, the described embodiments may be modified in various ways, all without departing from the spirit or scope of the present disclosure.

In order to clearly describe the present disclosure, parts or portions that are irrelevant to the description may be omitted, and identical or similar constituent elements throughout the specification may be denoted by the same or like reference numerals. Therefore, such reference numerals may be used in the descriptions of other drawings without duplicate description thereof.

Further, in the accompanying drawings, the size and/or thickness of each element may be arbitrarily illustrated for ease of description, and the present disclosure is not necessarily limited to those arbitrarily illustrated in the drawings. In the drawings, the thicknesses of layers, films, panels, regions, areas, or the like may be exaggerated for clarity.

In addition, expressions such as "equal to" or "the same as" in the description may mean "substantially equal to" or "substantially the same as".

FIG. 1 is provided for explaining a display device according to an embodiment of the present disclosure.

Referring to FIG. 1, a display device 1 may include a processor 9, a timing controller 11, a data driver 12, a scan driver 13, a pixel part 14, a light emission driver 15, and a power supply 16. Whether respective functional parts are integrated into one IC or a plurality of ICs, they may be configured in various ways according to various design criteria and/or specifications for the display device 1.

The timing controller 11 may receive grayscales and timing signals for each frame period from a processor 9. Here, the processor 9 may correspond to at least one of a graphics processing unit (GPU), a central processing unit (CPU), or an application processor (AP). The timing signals may include a vertical synchronization signal, a horizontal synchronization signal, a data enable signal, and the like.

Each cycle of the vertical synchronization signal may correspond to each frame period. Each cycle of the horizontal synchronization signal may correspond to each horizontal period. The grayscales may be supplied in units of a horizontal line in each horizontal period in response to a pulse of an enable level of the data enable signal. The horizontal line may mean pixels connected to the same scan line and emission line (for example, a pixel row).

The timing controller 11 may render grayscales to correspond to the specification of the display device 1. For example, the processor 9 may provide a red grayscale, a green grayscale, and a blue grayscale for each unit dot. For example, when the pixel part 14 has an RGB stripe structure, a pixel may correspond to each grayscale on a one to one basis. In this case, rendering of grayscales may not be necessary. However, for example, when the pixel part 14 has a PENTILE™ structure, since adjacent unit dots may share a pixel, the pixel need not correspond to each grayscale on a one to one basis. In this case, rendering of grayscales may be performed. Rendered or non-rendered grayscales may be provided to the data driver 12. In addition, the timing controller 11 may provide a data control signal to the data driver 12. In addition, the timing controller 11 may provide a scan control signal to the scan driver 13, and may provide an emission control signal to the emission driver 15.

The data driver 12 may generate data voltage (e.g., data signals) to be provided to data lines (DL1, DL2, DL3, DL4, . . . , DLn) by using the grayscales and the data control signals received from the timing controller 11. Here, n may be an integer larger than zero.

The scan driver 13 may generate scan signals to be provided to scan lines (SL0, SL1, SL2, . . . , SLm) by using a scan control signal (for example, a clock signal, a scan start signal, or the like) received from the timing controller 11. The scan driver 13 may sequentially supply scan signals having a turn-on level pulse to the scan lines SL0 to SLm. The scan driver 13 may include scan stages configured in a form of a shift register. The scan driver 13 may generate the scan signals through a method of sequentially transmitting a scan start signal, which is a pulse type of a turn-on level, to a next scan stage according to control of the clock signal. Here, m may be an integer larger than zero.

The emission driver 15 may generate emission signals to be provided to emission lines (EL1, EL2, EL3, . . . , ELo) by using an emission control signal (for example, a clock signal, an emission stop signal, or the like) received from the timing controller 11. The emission driver 15 may sequentially supply emission signals having a turn-off level pulse to the emission lines EL1 to ELo. The emission driver 15 may include emission stages configured in a form of a shift register. The emission driver 15 may generate emission signals by sequentially transmitting an emission stop signal having a form of a turn-off level pulse to a next emission stage depending on control of a clock signal. Here, o may be an integer larger than zero.

The pixel part 14 includes pixels. Each pixel PXij may be connected to a corresponding data line, scan line, and emission line. The pixels may include pixels that emit first color light, pixels that emit second color light, and pixels that emit third color light. The first color, the second color, and the third color may be different colors. For example, the first color may be one color of red, green, and blue, the second color may be one color of red, green, and blue excluding the first color, and the third color may be the remaining color of red, green, blue excluding the first and second colors. In addition, magenta, cyan, and yellow may be used instead of red, green, and blue as the first to third colors.

The power supply 16 may include a first power source 161 and a second power source 162. The first power source 161 and the second power source 162 may be configured with different ICs, or may be integrated within one IC. Each of the first power source 161 and the second power source 162 may be a voltage converter. For example, the first power source 161 may be a boost converter, and the second power source 162 may be a buck-boost converter.

The first power source 161 may provide a first power source voltage to the pixel part 14 through a first power line ELVDDL. The pixels of the pixel part 14 may be commonly connected to the first power line ELVDDL to receive the same first power source voltage. The second power source 162 may provide a second power source voltage to the pixel part 14 through a second power line ELVSSL. The pixels of the pixel part 14 may be commonly connected to the second power line ELVSSL to receive the same second power source voltage. During the display period of the pixel part 14, the first power source voltage may be larger than the second power source voltage. A power source current flowing from the first power source 161 through the first power supply line ELVDDL may flow into the second power source 162 through the second power supply line ELVSSL. Hereinafter, embodiments for the first power source 161 will be described, but corresponding embodiments may similarly be applied to the second power source 162 as well.

Figure 2:
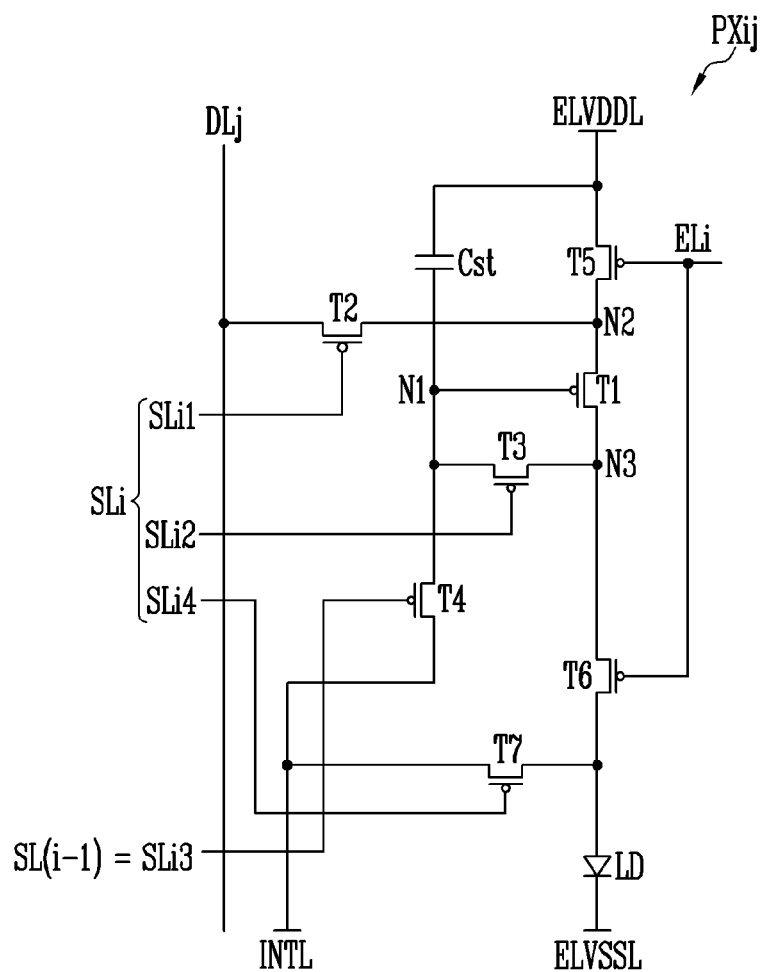
FIG. 2 is a circuit diagram for explaining a pixel according to an embodiment of the present disclosure.

FIG. 2 is provided for explaining a pixel according to an embodiment of the present disclosure.

Referring to FIG. 2, the pixel PXij includes transistors T1, T2, T3, T4, T5, T6, and T7, a storage capacitor Cst, and a light-emitting element LD.

Hereinafter, a circuit configured with a P-type of transistor will be described as an example (for example, PMOS). However, a person of an ordinary skill in the art, by changing a polarity of a voltage applied to a gate terminal, may design a circuit configured with an N-type of transistor (for example, NMOS). Similarly, a person of an ordinary skill in the art would be able to design a circuit configured with a combination of a P-type of transistor and an N-type of transistor. The P-type of transistor refers to a transistor in which an amount of current increases when a voltage difference between a gate electrode and a source electrode increases in a negative direction. The N-type of transistor refers to a transistor in which an amount of current increases when a voltage difference between a gate electrode and a source electrode increases in a positive direction. The transistor may have various types such as a thin film transistor (TFT), a field effect transistor (FET), or a bipolar junction transistor (BJT).

In the transistor T1, a gate electrode may be connected to a first node N1, a first electrode may be connected to a second node N2, and a second electrode may be connected to a third node N3. The first transistor T1 may be referred to as a driving transistor.

In the transistor T2, a gate electrode may be connected to a scan line SLi1, a first electrode may be connected to a data line DLj, and a second electrode may be connected to the second node N2. The transistor T2 may be referred to as a scan transistor.

In the transistor T3, a gate electrode may be connected to a scan line SLi2, a first electrode may be connected to the first node N1, and a second electrode may be connected to the third node N3. The transistor T3 may be referred to as a diode-connection transistor.

In the transistor T4, a gate electrode may be connected to a scan line SLi3, a first electrode may be connected to the first node N1, and a second electrode may be connected to an initialization line INTL. The transistor T4 may be referred to as a gate initialization transistor.

In the transistor T5, a gate electrode may be connected to an i-th emission line ELi, a first electrode may be connected to a first power line ELVDDL, and a second electrode may be connected to the second node N2. The transistor T5 may be referred to as an emission transistor. In an alternate embodiment, the gate electrode of the transistor T5 may be connected to an emission line different from an emission line connected to a gate electrode of the transistor T6.

In the transistor T6, the gate electrode may be connected to the i-th emission line ELi, a first electrode may be connected to the third node N3, and a second electrode may be connected to an anode of the light-emitting element LD. The transistor T6 may be referred to as an emission transistor. In an alternate embodiment, the gate electrode of the transistor T6 may be connected to an emission line different from an emission line connected to a gate electrode of the transistor T5.

In the transistor T7, a gate electrode may be connected to a scan line SLi4, a first electrode may be connected to the initialization line INTL, and a second electrode may be connected to the anode of the light-emitting element LD. The transistor T7 may be referred to as a light-emitting element initialization transistor.

A first electrode of the storage capacitor Cst may be connected to the first power line ELVDDL, and a second electrode thereof may be connected to the first node N1.

The anode of the light-emitting element LD may be connected to the second electrode of the transistor T6, and a cathode thereof may be connected to the second power line ELVSSL. The light-emitting element LD may be a light-emitting diode. The light-emitting element LD may include an organic light-emitting diode, an inorganic light-emitting diode, and a quantum dot/well light-emitting diode. The light-emitting element LD may emit light in one of a first color, a second color, and a third color. In addition, in the present embodiment, one light-emitting element LD is provided in each pixel; but in an alternate embodiment, a plurality of light-emitting elements may be provided in each pixel. In this case, the plurality of light-emitting elements may be connected in series, in parallel, or in series/parallel.

A first power source voltage may be applied to the first power line ELVDDL, a second power source voltage may be applied to the second power line ELVSSL, and an initialization voltage may be applied to the initialization line INTL. For example, the first power source voltage may be larger than the second power source voltage. For example, the initialization voltage may be equal to or larger than the second power source voltage. For example, the initialization voltage may correspond to a smallest one of data voltages that may be provided. In another example, the initialization voltage may be smaller than the data voltages that may be provided.

Figure 3:
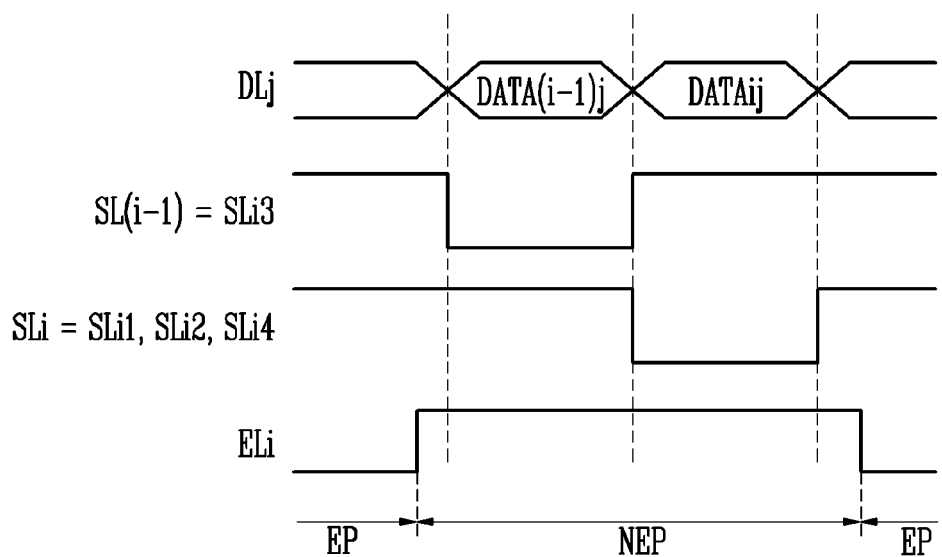
FIG. 3 is a timing diagram for explaining a driving method of the pixel of FIG. 2.

FIG. 3 is provided for explaining a driving method of the pixel of FIG. 2.

Hereinafter, to facilitate understanding and ease of description, it is assumed that the scan lines SLi1, SLi2, and SLi4 are i-th scan lines SLi, and the scan line SLi3 is an (i−1)-th scan line SL(i−1). However, the scan lines SLi1, SLi2, SLi3, and SLi4 may have various connection relationships according to alternate embodiments. For example, the scan line SLi4 may be the (i−1)-th scan line or the (i+1)-th scan line.

First, an emission signal having a turn-off level (e.g., logic high level) is applied to the i-th emission line ELi, a data voltage DATA(i−1)j for an (i−1)-th pixel is applied to the data line DLj, and a scan signal having a turn-on level (e.g., logic low level) is applied to the scan line SLi3. The logic high or low level may vary depending on whether the transistor is a P-type or an N-type transistor, for example.

In this case, since the scan signal having a turn-off level is applied to the scan lines SLi1 and SLi2, the transistor T2 is in a turn-off state, and it is prevented the data voltage DATA(i−1)j for the (i−1)-th pixel to be inputted to the pixel PXij.

In this case, since the transistor T4 is in a turned-on state, the first node N1 is connected to the initialization line INTL, so that a voltage of the first node N1 is initialized. Since the emission signal having a turn-off level is applied to the emission line ELi, the transistors T5 and T6 are in a turn-off state, and unnecessary light emission of the light-emitting element LD is prevented according to the initialization voltage application process.

Next, the data voltage DATAij for the i-th pixel PXij is applied to the data line DLj, and the scan signal having a turn-on level is applied to the scan lines SLi1 and SLi2. Accordingly, the transistors T2, T1, and T3 are turned on, and thus the data line DLj and the first node N1 are electrically connected. Accordingly, a compensation voltage obtained by subtracting a threshold voltage of the transistor T1 from the data voltage DATAij is applied to the second electrode (e.g., the first node N1) of the storage capacitor Cst, and the storage capacitor Cst maintains a voltage corresponding to a difference between the first power source voltage and the compensation voltage. This period may be referred to as a threshold voltage compensation period or data writing period.

In addition, when the scan line SLi4 is the i-th scan line, the transistor T7 is turned on, so the anode of the light-emitting element LD and the initialization line INTL are connected, and the light-emitting element LD is initialized with an amount of charge corresponding to a voltage difference between the initialization voltage and the second power source voltage.

Thereafter, as the emission signal having a turn-on level is applied to the i-th emission line ELi, the transistors T5 and T6 may be turned on. Accordingly, a driving current path connecting the first power line ELVDDL, the transistor T5, the transistor T1, the transistor T6, the light-emitting element LD, and the second power line ELVSSL is formed.

An amount of driving current flowing through the first and second electrodes of the transistor T1 is adjusted according to a voltage maintained in the storage capacitor Cst. The light-emitting element LD emits light with a luminance corresponding to the amount of driving current. The light-emitting element LD emits light until an emission signal of a turn-off level is applied to the emission line ELi.

When the emission signal has a turned-on level, pixels receiving the corresponding emission signal may be in a display state. Accordingly, a period in which the emission signal has the turned-on level may be referred to as an emission period EP (or an emission permissive period). In addition, when the emission signal has a turned-off level, pixels receiving the corresponding emission signal may be in a non-display state. Accordingly, a period in which the emission signal has the turned-off level may be referred to as a non-emission period NEP (or an emission non-permissive period).

The non-emission period NEP described in FIG. 3 is to prevent the pixel PXij from emitting light with undesired luminance during the initialization period and the data writing period.

While data written in the pixel PXij is maintained (for example, one frame period), one or more non-emission periods NEP may be additionally provided. This may be to effectively express a low grayscale by reducing the emission period EP of the pixel PXij, or to smoothly blur the motion of an image.

Figure 4:
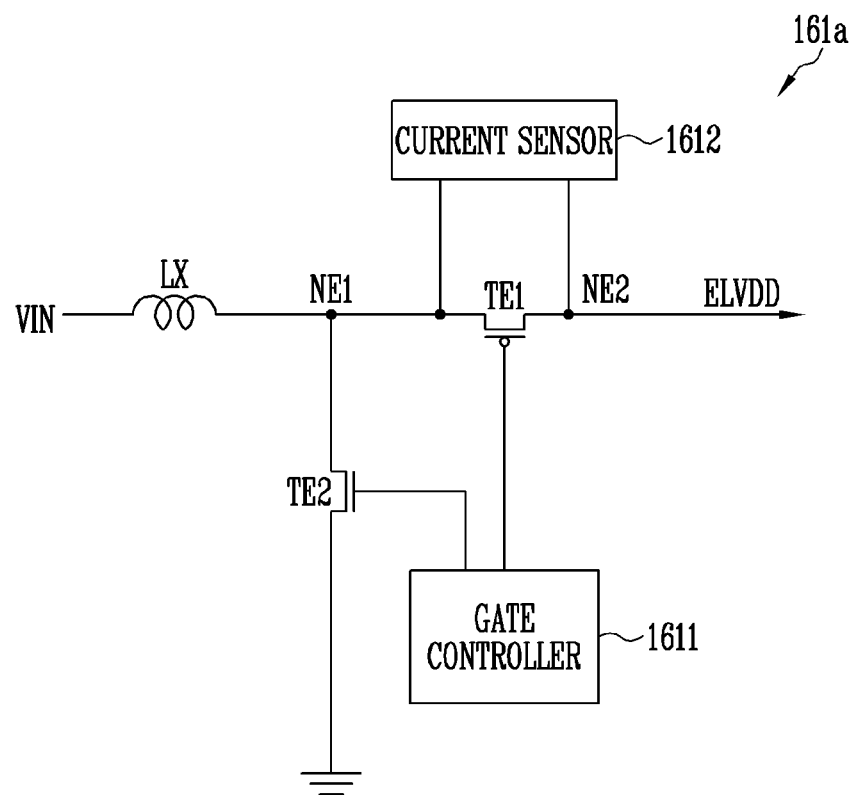
FIG. 4 is a circuit diagram for explaining a first power source according to an embodiment of the present disclosure.
Figure 5:
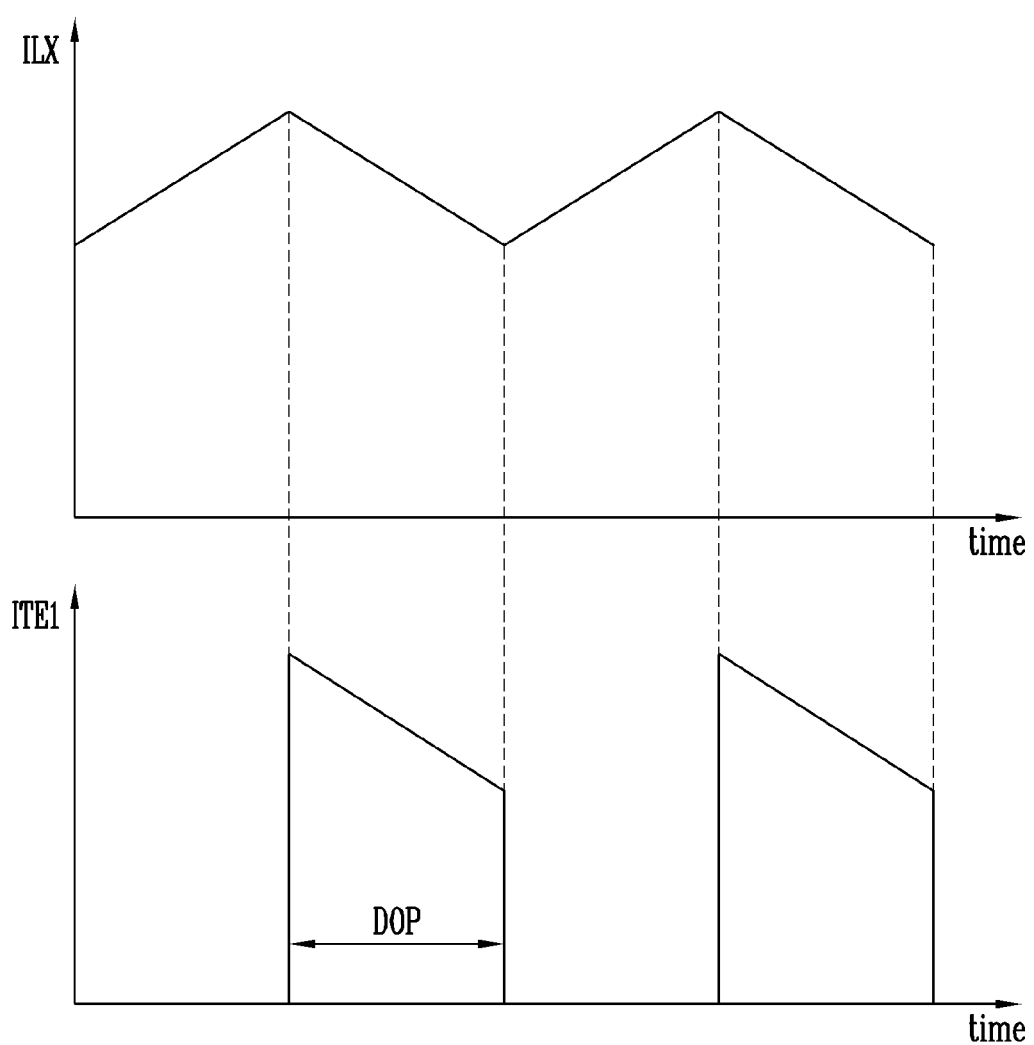
FIG. 5 is a timing diagram for explaining a first power source according to an embodiment of the present disclosure.

FIG. 4 and FIG. 5 are provided for explaining a first power source according to an embodiment of the present disclosure.

Referring to FIG. 4, a first power source 161a may include an inductor LX, a first transistor TE1, a second transistor TE2, a gate controller 1611, and a current sensor 1612. The first power source 161a is a voltage converter, and may be, for example, a boost converter.

A first electrode of the inductor LX may receive an input voltage VIN, and a second electrode thereof may be connected to a first node NE1.

A first electrode of the first transistor TE1 may be connected to the first node NE1, and a second electrode thereof may be connected to a second node NE2 that provides an output voltage. In this case, the output voltage may be a first power source voltage ELVDD.

A first electrode of the second transistor TE2 may be connected to the first node NE1, and a second electrode thereof may be connected to a reference terminal. For example, the reference terminal may be a ground or a constant voltage source.

The current sensor 1612 may be connected to the first node NE1 and the second node NE2. The current sensor 1612 may sense a current flowing through the first transistor TE1 between the first node NE1 and the second node NE2.

The gate controller 1611 may generate control signals for the first transistor TE1 and the second transistor TE2. The control signals generated by the gate controller 1611 may be applied to a gate electrode of the first transistor TE1 and the second transistor TE2, respectively. For example, a control signal may be a pulse width modulation (PWM) signal having an on/off duty ratio. According to the on/off duty ratio of the control signals, the transistors TE1 and TE2 may be alternately turned on/off.

Referring to FIG. 5, when the second transistor TE2 is turned on and the first transistor TE1 is turned off, energy is stored in the inductor LX while a current ILX of the inductor LX increases. In this case, since the first transistor TE1 is in a turned-off state, a current ITE1 does not flow through the first transistor TE1.

Next, when the second transistor TE2 is turned off and the first transistor TE1 is turned on, a current output from the input voltage VIN or from the input power source and a current output from the inductor LX are added, so that an amplified first power source voltage ELVDD is applied to the first power line ELVDDL. As the duty ratio of the control signal increases, the first power source voltage ELVDD may increase.

In this case, when the current ITE1 flowing through the first transistor TE1 is integrated during a duty on period (DOP) in which the first transistor TE1 is turned on, the current flowing through the first power line ELVDDL may be found. Since the period (DOP) is a value preset in the gate controller 1611, it is already known, and when the current ITE1 may be sensed through the current sensor 1612, a current flowing through the first power line ELVDDL may be found even without a sensing resistor. Accordingly, the first power source 161a according to the embodiment of the present disclosure may know the current flowing through the first power line ELVDDL without power consumption by a sensing resistor.

In the embodiment of FIG. 4, the first transistor TE1 is a P-type of transistor and the second transistor TE2 is an N-type of transistor; but when a polarity of the control signal is varied or a plurality of control signals are used, the first and second transistors TE1 and TE2 may be freely configured.

Figure 6:
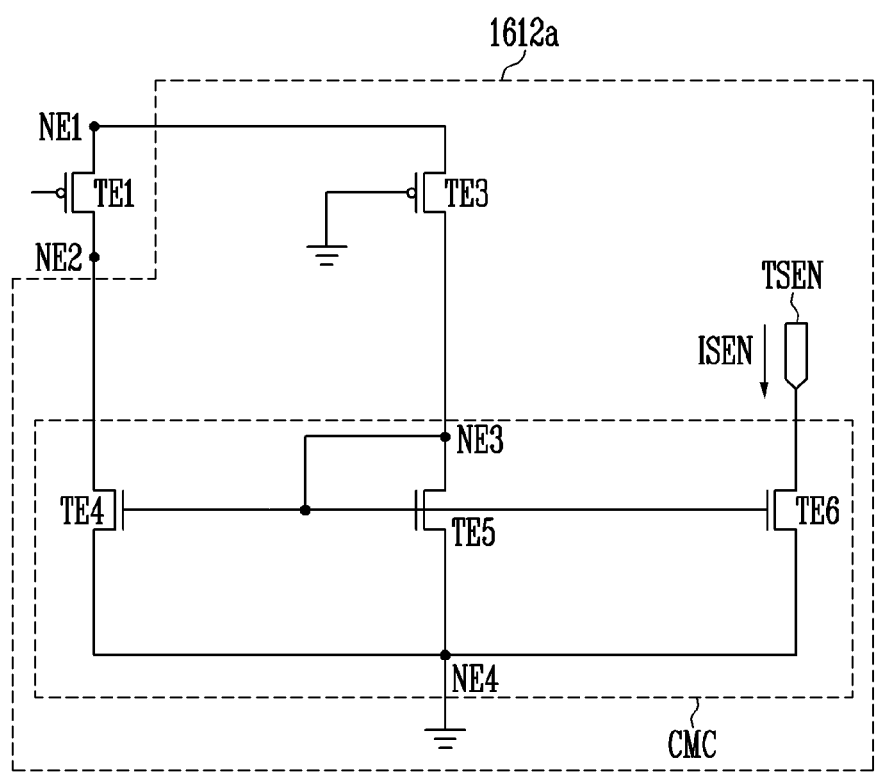
FIG. 6 is a circuit diagram for explaining a current sensor according to an embodiment of the present disclosure.
Figure 7:
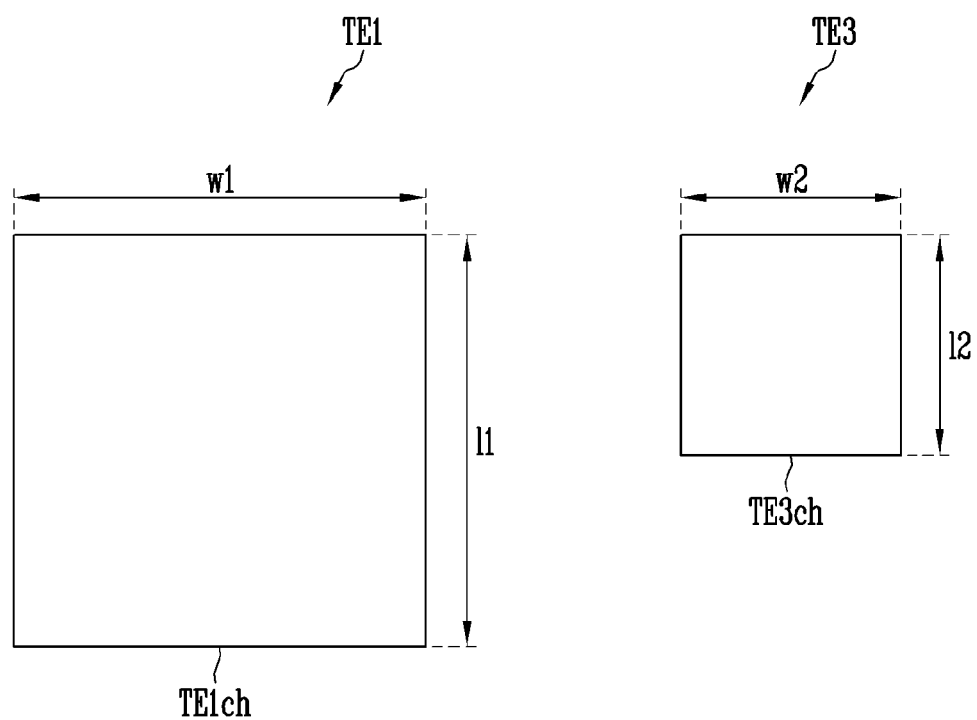
FIG. 7 is a conceptual diagram for explaining a current sensor according to an embodiment of the present disclosure.

FIG. 6 and FIG. 7 are provided for explaining a current sensor according to an embodiment of the present disclosure.

Referring to FIG. 6, a current sensor 1612a may be connected to the first node NE1 and the second node NE2. For example, the current sensor 1612a may include a third transistor TE3 and a current mirror circuit (CMC).

A first electrode of the third transistor TE3 may be connected to the first node NE1, and a second electrode thereof may be connected to a third node NE3. Meanwhile, a gate electrode of the third transistor TE3 may be connected to a reference terminal. For example, the reference terminal may be a ground or a constant voltage source. For example, the third transistor TE3 may be a P-type of transistor.

The current mirror circuit CMC may mirror a current flowing between the second node NE2 and a fourth node NE4, a current flowing between the third node NE3 and the fourth node NE4, and a current ISEN flowing between a sensing terminal TSEN and the fourth node NE4. The current ISEN is a sensing current, and may correspond to the current ITE1 flowing through the first transistor TE1. For example, the current mirror circuit CMC may include a fourth transistor TE4, a fifth transistor TE5, and a sixth transistor TE6.

A first electrode of the fourth transistor TE4 may be connected to the second node NE2, a second electrode thereof may be connected to the fourth node NE4, and a gate electrode thereof may be connected to the third node NE3. For example, the fourth transistor TE4 may be an N-type of transistor.

A first electrode of the fifth transistor TE5 may be connected to the third node NE3, a second electrode thereof may be connected to the fourth node NE4, and a gate electrode thereof may be connected to the third node NE3. For example, the fifth transistor TE5 may be an N-type of transistor.

A first electrode of the sixth transistor TE6 may be connected to the sensing terminal TSEN, a second electrode thereof may be connected to the fourth node NE4, and a gate electrode thereof may be connected to the third node NE3. For example, the sixth transistor TE6 may be an N-type of transistor.

The gate electrodes of the fourth to sixth transistors TE4, TE5, and TE6 are commonly connected to the third node NE3, and the source electrodes thereof are commonly connected to the fourth node NE4. Accordingly, since gate-source voltage differences of the fourth to sixth transistors TE4, TE5, and TE6 are the same, the current mirror circuit CMC may mirror the current flowing between the second node NE2 and the fourth node NE4, the current flowing between the third node NE3 and the fourth node NE4, and the current ISEN flowing between the sensing terminal TSEN and the fourth node NE4. Accordingly, the current ITE1 flowing through the first transistor TE1 may be recognized through the current ISEN of the sensing terminal TSEN.

Referring to FIG. 7, an area occupied by the third transistor TE3 may be smaller than an area occupied by the first transistor TE1. For example, an area of a channel TE3ch of the third transistor TE3 may be smaller than an area of a channel TE1ch of the first transistor TE1.

The channel TE1ch of the first transistor TE1 and the channel TE3ch of the third transistor TE3 may be formed simultaneously by etching the same semiconductor layer. For example, thicknesses of the channels TE1ch and TE3ch may be the same, and the planar areas thereof may be different.

The channel TE1ch of the first transistor TE1 may have a first width w1 and a first length l1. A source electrode and a drain electrode of the first transistor TE1 may be formed by doping semiconductor layers of both end portions defining the first length l1 of the channel TE1ch with a P-type of dopant. The area of the first transistor TE1 or the area of the channel TE1ch may correspond to a product of the first width w1 and the first length l1. However, the channel TE1ch may have a shape other than a rectangular shape.

The channel TE3ch of the third transistor TE3 may have a second width w2 and a second length l2. A source electrode and a drain electrode of the third transistor TE3 may be formed by doping semiconductor layers of both end portions defining the second length l2 of the channel TE3ch with a P-type of dopant. The area of the third transistor TE3 or the area of the channel TE3ch may correspond to a product of the second width w2 and the second length l2. However, the channel TE3ch may have a shape other than a rectangular shape.

According to the present embodiment, a rate of change of ON-resistance of the third transistor TE3 according to a temperature change may be smaller than a rate of change of ON-resistance of the first transistor TE1. Accordingly, even when the On-resistance of the first transistor TE1 is changed due to a change in an external temperature, the current ITE1 flowing through the first transistor TE1 is affected by the On-resistance of the third transistor TE3 by the current mirror circuit CMC. Therefore, a deviation of the current ISEN of the sensing terminal TSEN according to the external temperature change may be substantially reduced or eliminated. Therefore, according to the present embodiment, it is possible to provide a voltage converter (e.g., the first power source 161a) substantially unaffected by external temperature change.

Figure 8:
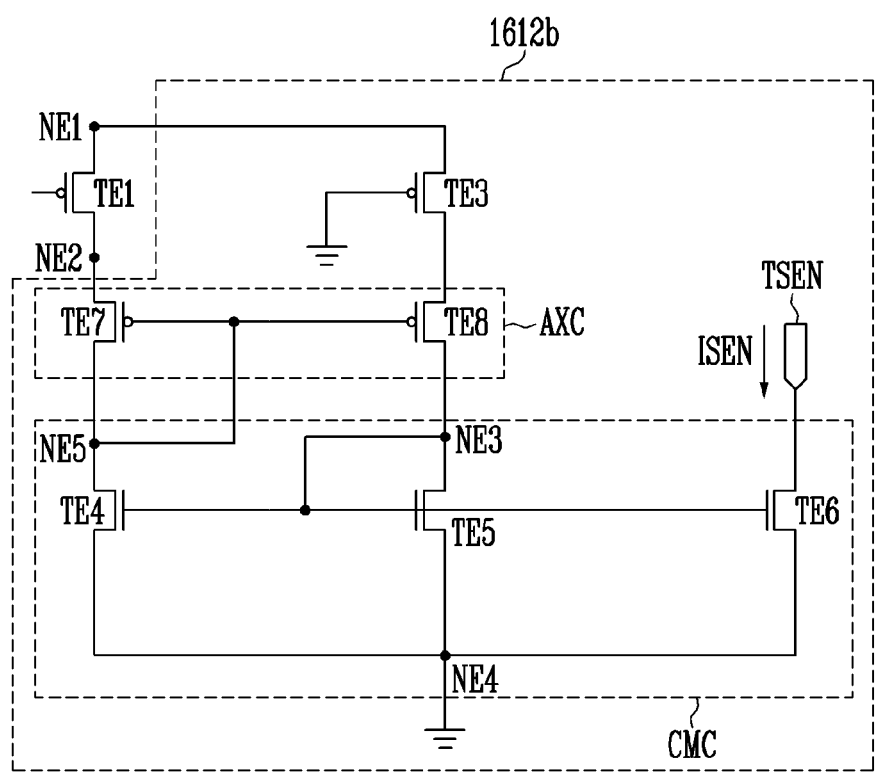
FIG. 8 is a circuit diagram for explaining a current sensor according to an alternate embodiment of the present disclosure.

FIG. 8 is provided for explaining a current sensor according to an alternate embodiment of the present disclosure.

Referring to FIG. 8, a current sensor 1612b may be connected to the first node NE1 and the second node NE2. For example, the current sensor 1612b may include a third transistor TE3, a current mirror circuit CMC, and an auxiliary circuit AXC. Hereinafter, in describing the current sensor 1612b, substantially duplicate description of portions comparable to the current sensor 1612a may be omitted.

A first electrode of the third transistor TE3 may be connected to the first node NE1, and may include a second electrode. Meanwhile, a gate electrode of the third transistor TE3 may be connected to the reference terminal. For example, the reference terminal may be a ground or a constant voltage source. For example, the third transistor TE3 may be a P-type of transistor. An area occupied by the third transistor TE3 may be smaller than an area occupied by the first transistor TE1. For example, an area of a channel TE3ch of the third transistor TE3 may be smaller than an area of a channel TE1ch of the first transistor TE1. According to the present embodiment, it is possible to provide a voltage converter (e.g., the first power source 161a) substantially unaffected by external temperature change.

The current mirror circuit CMC may mirror a current flowing between the third node NE3 and the fourth node NE4, a current flowing between the fifth node NE5 and the fourth node NE4, and the current ISEN flowing between the sensing terminal TSEN and the fourth node NE4. The current ISEN is a sensing current, and may correspond to the current ITE1 flowing through the first transistor TE1. For example, the current mirror circuit CMC may include a fourth transistor TE4, a fifth transistor TE5, and a sixth transistor TE6.

A first electrode of the fourth transistor TE4 may be connected to the fifth node NE5, a second electrode thereof may be connected to the fourth node NE4, and a gate electrode thereof may be connected to the third node NE3. For example, the fourth transistor TE4 may be an N-type of transistor.

A first electrode of the fifth transistor TE5 may be connected to the third node NE3, a second electrode thereof may be connected to the fourth node NE4, and a gate electrode thereof may be connected to the third node NE3. For example, the fifth transistor TE5 may be an N-type of transistor.

A first electrode of the sixth transistor TE6 may be connected to the sensing terminal TSEN, a second electrode thereof may be connected to the fourth node NE4, and a gate electrode thereof may be connected to the third node NE3. For example, the sixth transistor TE6 may be an N-type of transistor.

The gate electrodes of the fourth to sixth transistors TE4, TE5, and TE6 are commonly connected to the third node NE3, and the source electrodes thereof are commonly connected to the fourth node NE4. Accordingly, since gate-source voltage differences of the fourth to sixth transistors TE4, TE5, and TE6 are the same, the current mirror circuit CMC may mirror the current flowing between the third node NE3 and the fourth node NE4, the current flowing between the fifth node NE5 and the fourth node NE4, and the current flowing between the sensing terminal TSEN and the fourth node NE4. Accordingly, the current ITE1 flowing through the first transistor TE1 may be recognized through the current ISEN of the sensing terminal TSEN.

The auxiliary circuit AXC may connect the second node NE2 and the fifth node NE5, and may connect the second electrode of the third transistor TE3 to the third node NE3. The auxiliary circuit AXC may include a seventh transistor TE7 and an eighth transistor TE8.

A first electrode of the seventh transistor TE7 may be connected to the second node NE2, a second electrode thereof may be connected to the fifth node NE5, and a gate electrode thereof may be connected to the fifth node NE5. For example, the seventh transistor TE7 may be a P-type of transistor.

A first electrode of the eighth transistor TE8 may be connected to the second electrode of the third transistor TE3, a second electrode thereof may be connected to the third node NE3, and a gate electrode thereof may be connected to the fifth node NE5. For example, the eighth transistor TE8 may be a P-type of transistor.

In the seventh transistor TE7 and the eighth transistor TE8, the gate electrodes are commonly connected to the fifth node NE5, and the source electrodes are connected to each other when the first and third transistors TE1 and TE3 are turned on, so that the voltage differences between the gates and the sources may be the same. Accordingly, the auxiliary circuit AXC may operate as an auxiliary current mirror circuit, and may optimize the sensing accuracy of the current sensor 1612b.

Figure 9:
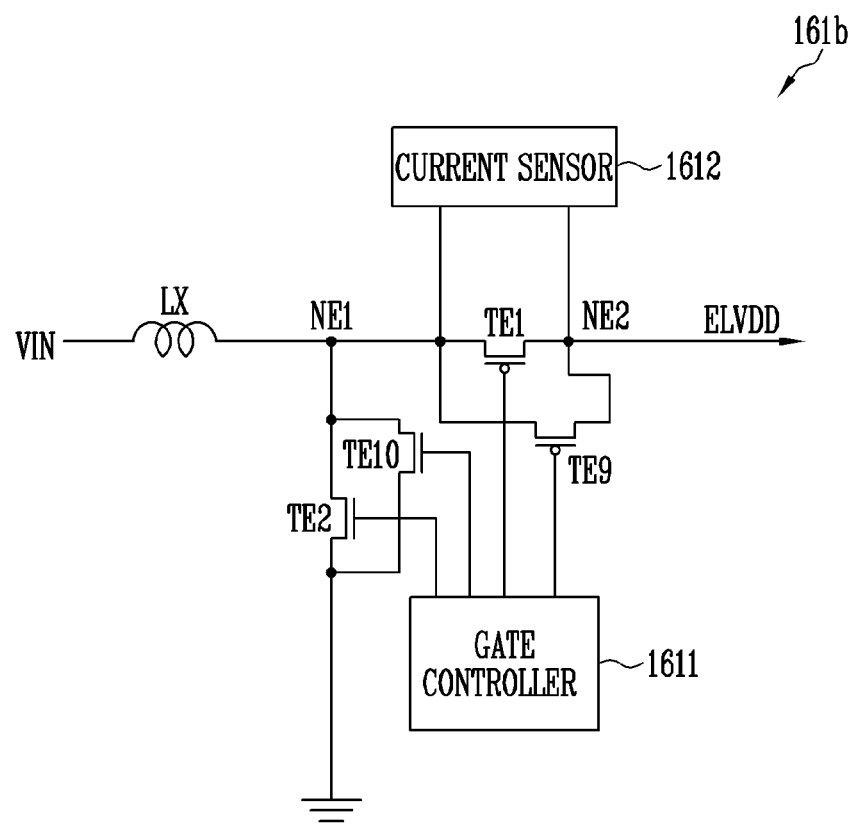
FIG. 9 is a circuit diagram for explaining a first power source according to an alternate embodiment of the present disclosure.
Figure 10:
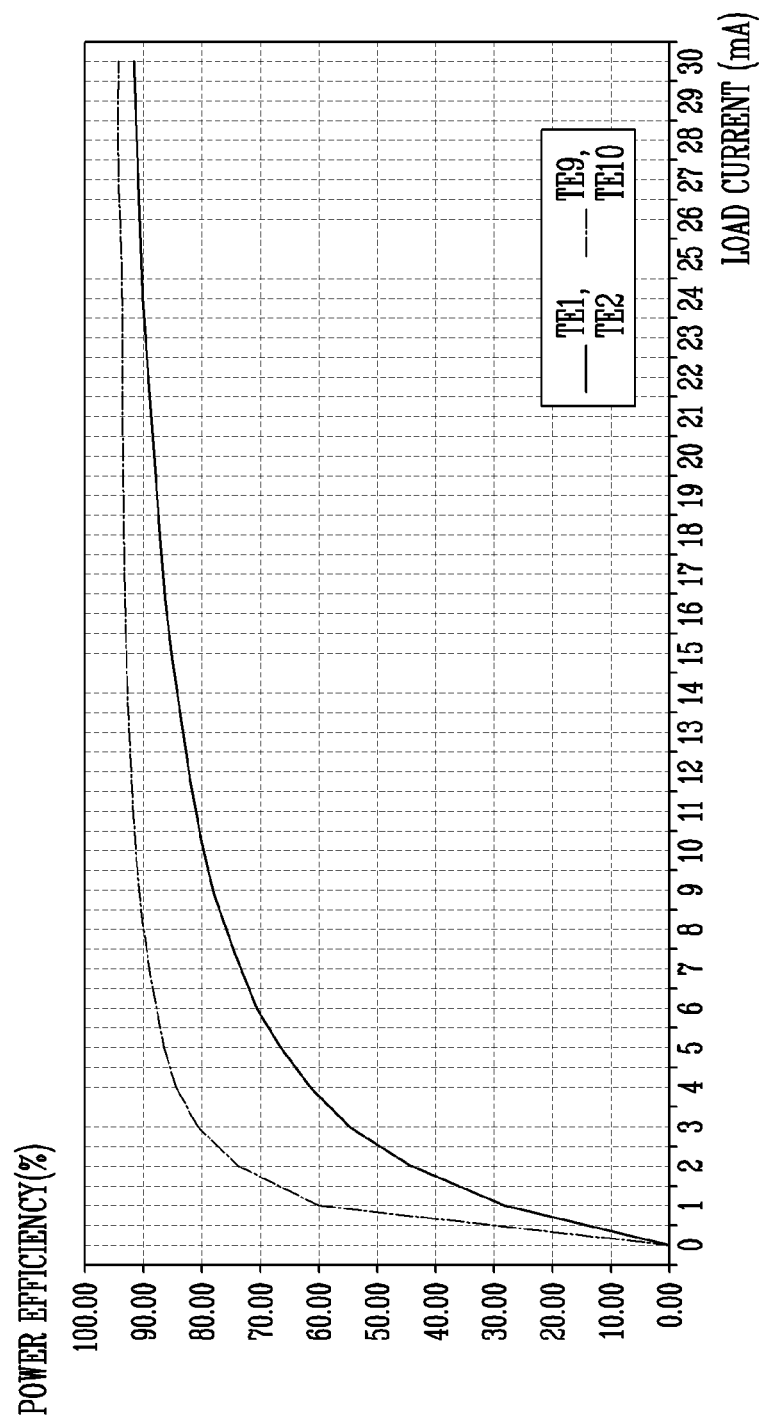
FIG. 10 is a graphical diagram for explaining a first power source according to an embodiment of the present disclosure.

FIG. 9 and FIG. 10 are provided for explaining a first power source according to an alternate embodiment of the present disclosure.

Referring to FIG. 9, compared with the first power source 161a of FIG. 4, a first power source 161b may further include a ninth transistor TE9 and a tenth transistor TE10.

The ninth transistor TE9 may be connected in parallel to the first transistor TE1. In the embodiment, an area occupied by the ninth transistor TE9 may be smaller than an area occupied by the first transistor TE1. For example, an area of a channel of the ninth transistor TE9 may be smaller than the area of the channel of the first transistor TE1. Since the area of the transistor and the area of the channel thereof have already been described with reference to FIG. 7, repeated descriptions thereof will be omitted. For example, the ninth transistor TE9 may be a P-type of transistor.

The tenth transistor TE10 may be connected in parallel to the second transistor TE2. For example, the tenth transistor TE10 may be an N-type of transistor. In the embodiment, an area occupied by the tenth transistor TE10 may be smaller than an area occupied by the second transistor TE2. For example, an area of a channel of the tenth transistor TE10 may be smaller than the area of the channel of the second transistor TE2.

When the current ISEN sensed through the current sensor 1612 is less than a reference value (for example, when a display image is of a low grayscale, e.g., when a load is small), in voltage conversion, the first power source 161b may use the ninth transistor TE9 and the tenth transistor TE10, and may not use the first transistor TE1 and the second transistor TE2.

In the meantime, when the current ISEN sensed through the current sensor 1612 is larger than the reference value (for example, when a display image is of a high grayscale), in voltage conversion, the first power source 161b may not use the ninth transistor TE9 and the tenth transistor TE10, and may use the first transistor TE1 and the second transistor TE2.

FIG. 10 exemplarily illustrates a graph when using the first transistor TE1 and the second transistor TE2, and a graph when using the ninth transistor TE9 and tenth transistor TE10. Each graph indicates power efficiency versus load current. The load current refers to a current flowing through the first power line ELVDDL, and a unit thereof may be mA. The power efficiency refers to a ratio of output power to input power, and a unit thereof may be %.

Referring to FIG. 10, when the load current is small, the power efficiency is relatively high when the ninth transistor TE9 and the tenth transistor TE10 are used. This is because the areas of the ninth transistor TE9 and the tenth transistor TE10 are relatively small, and thus capacitances of the transistors TE9 and TE10 are small, and thus switching loss at a small load is reduced.

In an alternate embodiment, when the current ISEN sensed through the current sensor 1612 is larger than the reference value (for example, when the display image is of a high grayscale or the load is large), in voltage conversion, the first power source 161b may use the first transistor TE1, the second transistor TE2, the ninth transistor TE9, and the tenth transistor TE10.

FIG. 11 to FIG. 14 are provided for explaining a power supply according to an alternate embodiment of the present disclosure.

Figure 11:
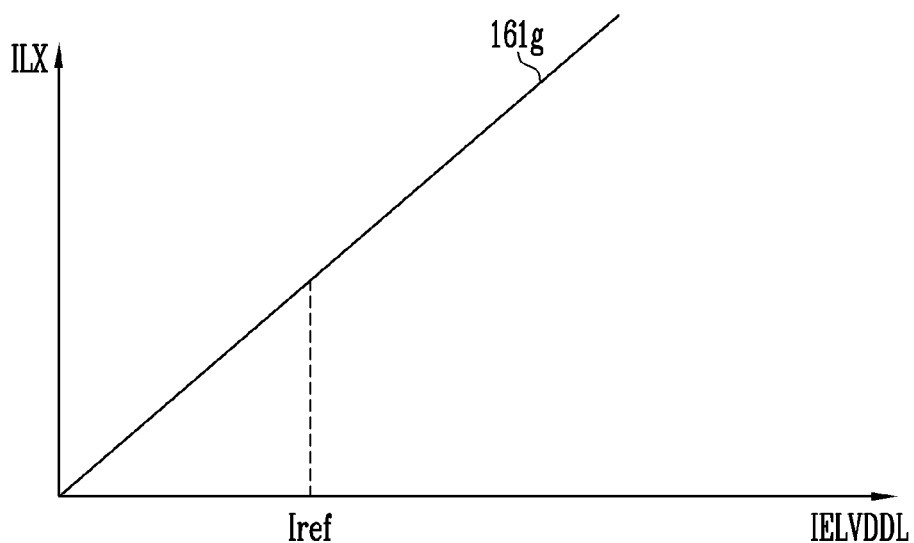
FIG. 11 is a graphical diagram for explaining a power supply according to an alternate embodiment of the present disclosure.

FIG. 11 illustrates a graph 161g of an inductor current ILX versus a first power source current IELVDDL when the power supply 16 includes one first power source 161. In this case, the inductor current ILX may increase as the first power source current IELVDDL increases regardless of a reference current Iref.

Figure 12:
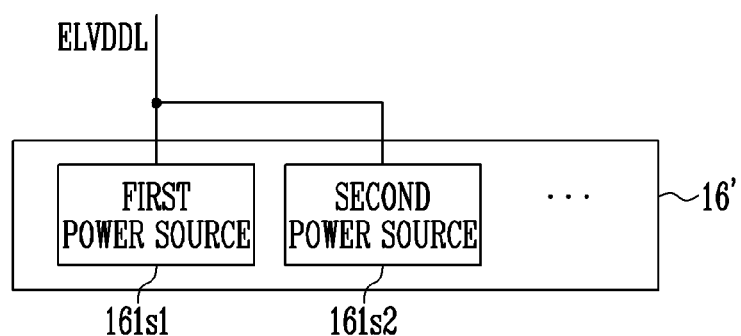
FIG. 12 is a block diagram for explaining a power supply according to an embodiment of the present disclosure.

Referring to FIG. 12, a power supply 16' may include a plurality of first power sources 161s1 and 161s2. The plurality of first power sources 161s1 and 161s2 may be a plurality of voltage converters. Output terminals of the plurality of first power sources 161s1 and 161s2 may be commonly connected to the first power line ELVDDL.

Figure 13:
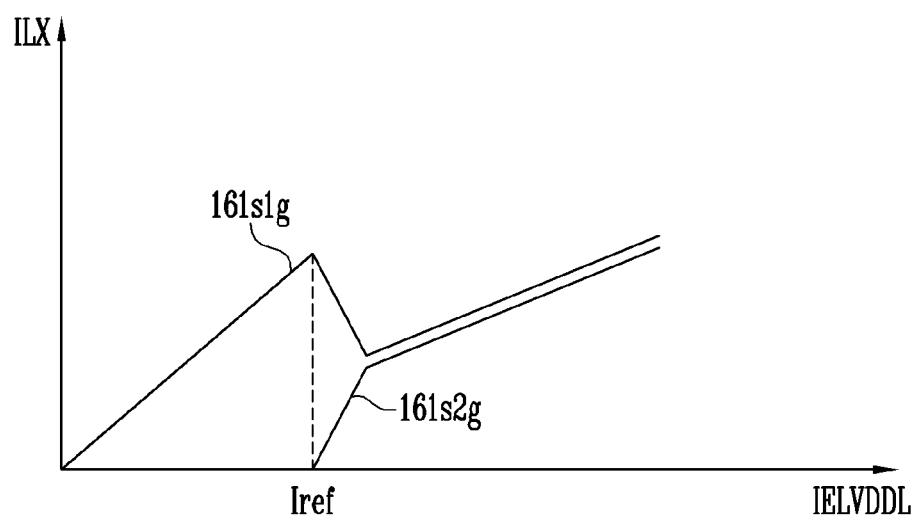
FIG. 13 is a graphical diagram for explaining a power supply according to an embodiment of the present disclosure.

FIG. 13 illustrates a graph 161s1g of the inductor current ILX of the first power source 161s1 versus the first power source current IELVDDL, and a graph 161s2g of the inductor current ILX of the second power source 161s2 versus the first power source current IELVDDL.

In the present embodiment, when the first power source current IELVDDL flowing in the first power line ELVDDL is less than the reference current Iref (for example, when the display image is of a low grayscale, e.g., when the load is small), the first voltage converter (e.g., the first power source 161s1) may generate the first power source current IELVDDL.

In addition, when the first power source current IELVDDL is larger than the reference current Iref (for example, when the display image is of a high grayscale), the first voltage converter (e.g., the first power source 161s1) and the second voltage converter (e.g., the second power source 161s2) may generate the first power source current IELVDDL together.

According to the present embodiment, it is possible to reduce the switching loss by using the first voltage converter (e.g., the first power source 161s1) in a relatively small load. Since the switching loss is affected by the capacitance of the transistor, the switching loss may be reduced by not being affected by the capacitance of the transistor included in the second voltage converter (e.g., the second power source 161s2).

In a relatively large load, conduction loss may be reduced by driving the first and second voltage converters 161s1 and 161s2 together. Since the conduction loss is affected by the on-resistance, the on-resistance may be reduced by generating a plurality of current paths by driving the first and second voltage converters 161s1 and 161s2 together.

Figure 14:
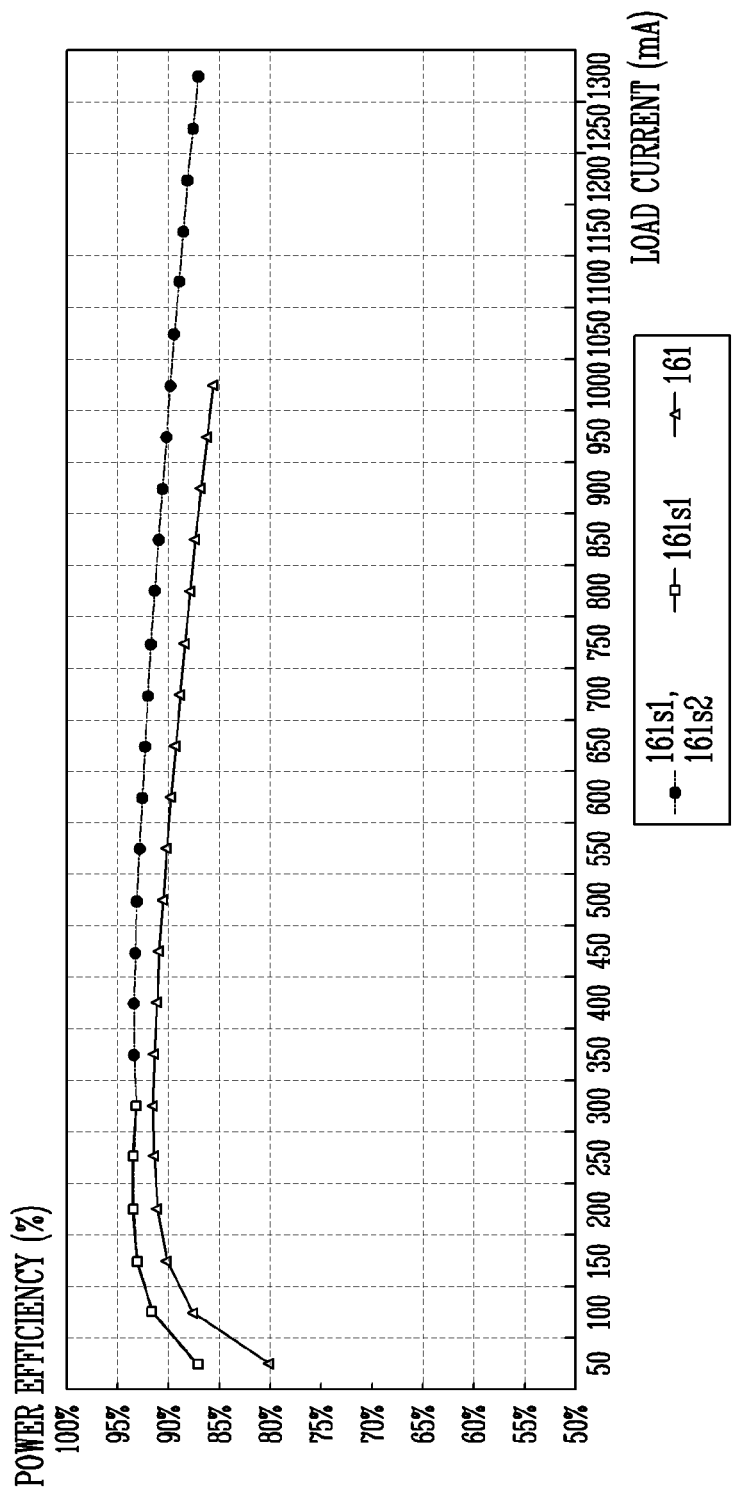
FIG. 14 is a graphical diagram for explaining a power supply according to an embodiment of the present disclosure.

FIG. 14 illustrates graphs for examples when a power supply 16' uses the first power source 161s1, when the power supply 16' uses a plurality of first power sources 161s1 and 161s2, and when the power supply 16 uses one first power source 161, respectively. Each graph indicates power efficiency versus load current. The load current refers to a current flowing through the first power line ELVDDL, and a unit thereof may be mA. The power efficiency refers to a ratio of output power to input power, and a unit thereof may be %.

Referring to FIG. 14, it can be seen that the power supply 16' has higher power efficiency within the entire load current region than the power supply 16.

Figure 15:
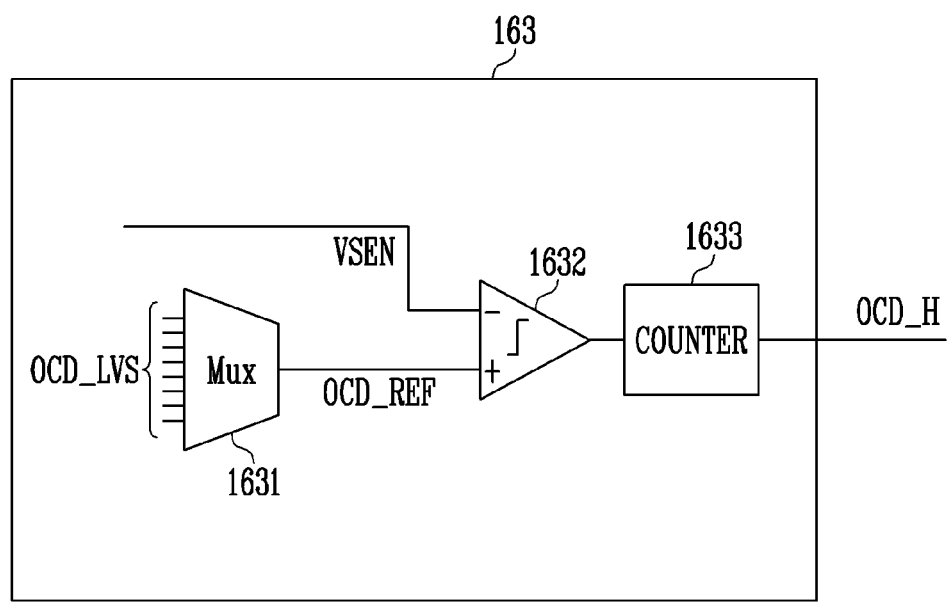
FIG. 15 is a block diagram for explaining an overcurrent detecting method according to an embodiment of the present disclosure.

FIG. 15 is provided for explaining an overcurrent detecting method according to an embodiment of the present disclosure.

Referring to FIG. 15, the power supply 16 (or the first power source 161) may further include an overcurrent detector 163. The overcurrent detector 163 may be configured with an analog circuit, may be configured with a digital circuit, and/or may be configured with software. The overcurrent detector 163 may include a multiplexer 1631, a comparator 1632, and a counter 1633.

The multiplexer 1631 may receive a plurality of shutdown voltage levels OCD_LVS, and may output one of the plurality of shut-down voltage levels OCD_LVS as a reference voltage level OCD_REF. Accordingly, a user can set the reference voltage level OCD_REF differently for each scenario.

The comparator 1632 may receive the reference voltage level OCD_REF at a first input terminal thereof (for example, a non-inverting terminal), and may receive a sensing voltage VSEN corresponding to the current ISEN of the sensing terminal TSEN at a second input terminal thereof (for example, an inverting terminal). The comparator 1632 may be configured as an operational amplifier (OP-AMP). The sensing voltage VSEN may be calculated by multiplying the current ISEN by a predetermined resistance constant.

For example, when the sensing voltage VSEN is the same as the reference voltage level OCD_REF (or when a difference between the sensing voltage VSEN and the reference voltage level OCD_REF is within an effective range), the comparator 1632 may output an effective output signal having the first voltage level. Meanwhile, when the sensing voltage VSEN is different from the reference voltage level OCD_REF (or when the difference between the sensing voltage VSEN and the reference voltage level OCD_REF is outside the effective range), the comparator 1632 may output an output signal having the second voltage level.

The counter 1633 may provide a shut-down signal OCD_H when the output of the comparator 1632 is within the effective output range for a predetermined time or longer. For example, the counter 1633 repeatedly checks the output of the comparator 1632 in units of 1 ms, and when the output of the comparator 1632 corresponds to an effective output signal continuously for a predetermined number of times or more, the counter 1633 may provide the shutdown signal OCD_H.

When the shut-down signal OCD_H occurs, the power supply 16 (or the first power source 161) may stop (shutdown) the operation of the first power source 161 or the power supply 16.

According to the present embodiment, an external resistor of the first power source 161 is not required, and internal sensing with respect to the first transistor TE1 is possible, so that one of various shut-down voltage levels OCD_LVS may be set as the reference voltage level OCD_REF. For reference, in the conventional output current detection (OCD) method, the first power source 161 may use an external resistor, and but one shut-down voltage level corresponding to resistance of the external resistor may be used.

FIG. 16 to FIG. 20 are provided for explaining a first power source according to an alternate embodiment of the present disclosure.

Figure 16:
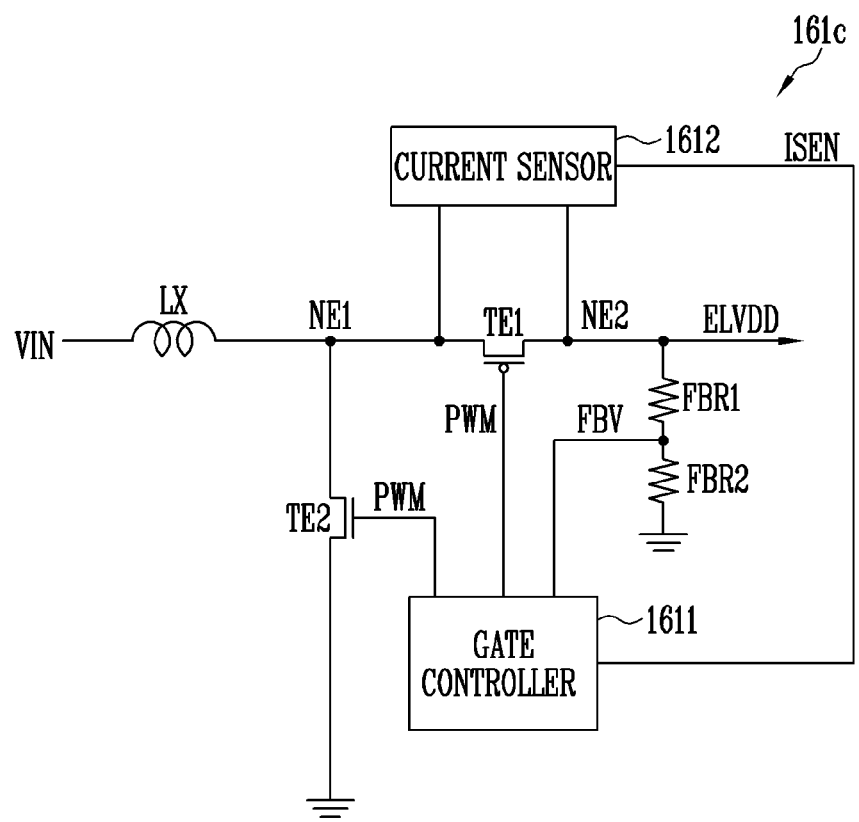
FIG. 16 is a circuit diagram for explaining a first power source according to an alternate embodiment of the present disclosure.

Referring to FIG. 16, a first power supply 161c is different from the first power supply 161a of FIG. 4 in that it further includes feedback resistors FBR1 and FBR2. In this case, the gate controller 1611 may further receive a feedback voltage FBV that is a divided voltage of the feedback resistors FBR1 and FBR2 and the sensed current ISEN. The gate controller 1611 may provide a PWM signal PWM based on the feedback voltage FBV and the current ISEN.

Figure 17:
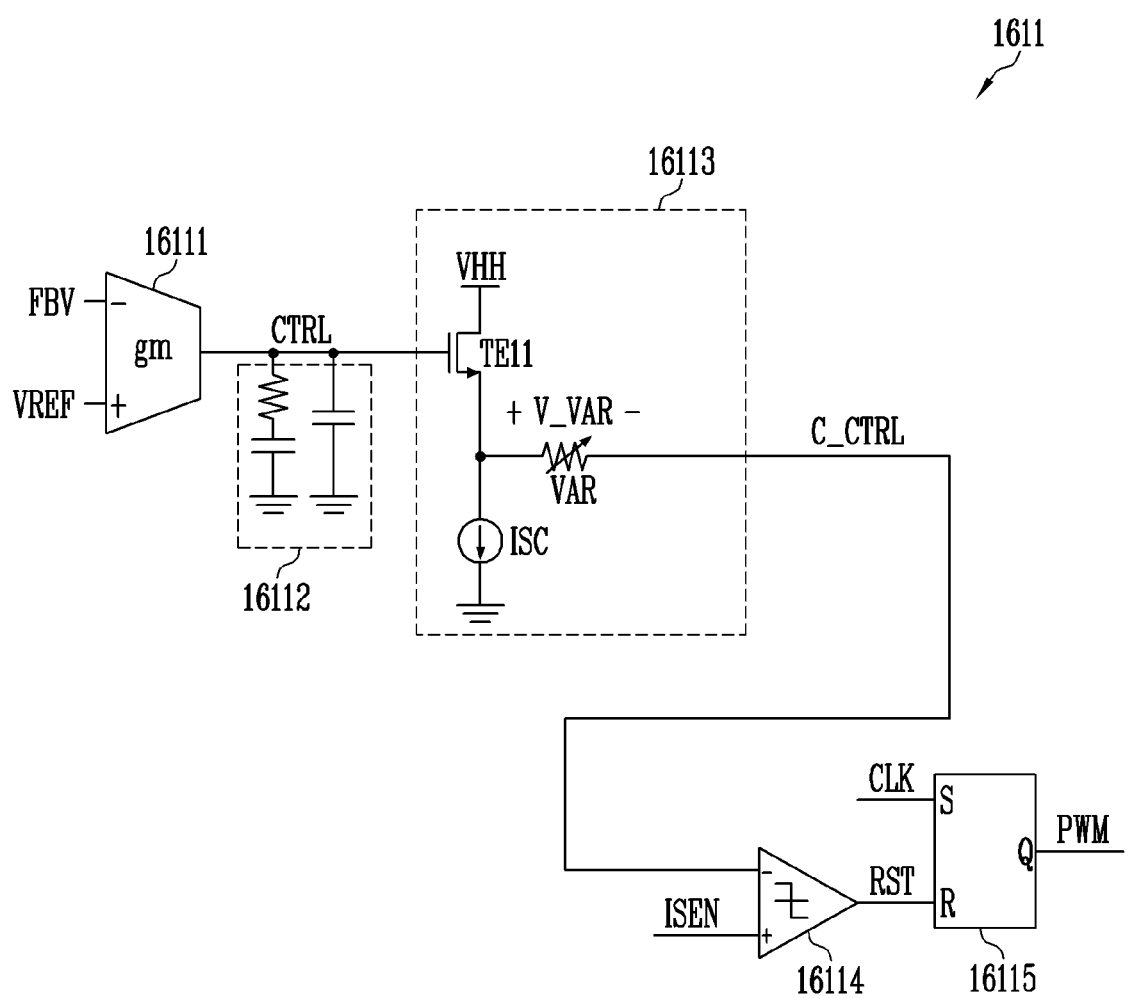
FIG. 17 is a circuit diagram for explaining a first power source according to an embodiment of the present disclosure.

Referring to FIG. 17, the gate controller 1611 may include a comparator 16111, a filter 16112, a compensator 16113, a comparator 16114, and a modulator 16115.

The comparator 16111 may generate a control voltage CTRL corresponding to a value obtained by multiplying a difference between the feedback voltage FBV and the reference voltage VREF by a gain (gm). The filter 16112 may be a low-pass filter. The filter 16112 may be removed, or another type of filter may be provided.

The compensator 16113 may generate a compensation control voltage C_CTRL based on the control voltage CTRL and the load current. For example, the compensator 16113 may include an eleventh transistor TE11 and a current source ISC connected in series between a high voltage VHH and the ground. For example, the eleventh transistor TE11 may be an NMOS transistor, and the compensator 16113 may include a variable resistor VAR connected to a source electrode of the eleventh transistor TE11. The compensator 16113 may adjust a compensation voltage V_VAR applied to the variable resistor VAR by adjusting a resistance value of the variable resistor VAR based on the load current. For example, the compensator 16113 may adjust the resistance value of the variable resistor VAR to decrease as the load current increases. When the resistance value of the variable resistor VAR is reduced, the compensation voltage V_VAR is also reduced. For example, the compensator 16113 may be a time division multiple access (TDMA) compensator.

When the compensation voltage V_VAR is decreased while the control voltage CTRL is constantly kept, the compensation control voltage C_CTRL may be increased. Meanwhile, when the control voltage CTRL is decreased while the compensation voltage V_VAR is constantly kept, the compensation control voltage C_CTRL may be decreased. For example, the compensation control voltage C_CTRL may be variously determined according to the control voltage CTRL and the compensation voltage V_VAR.

Figure 18:
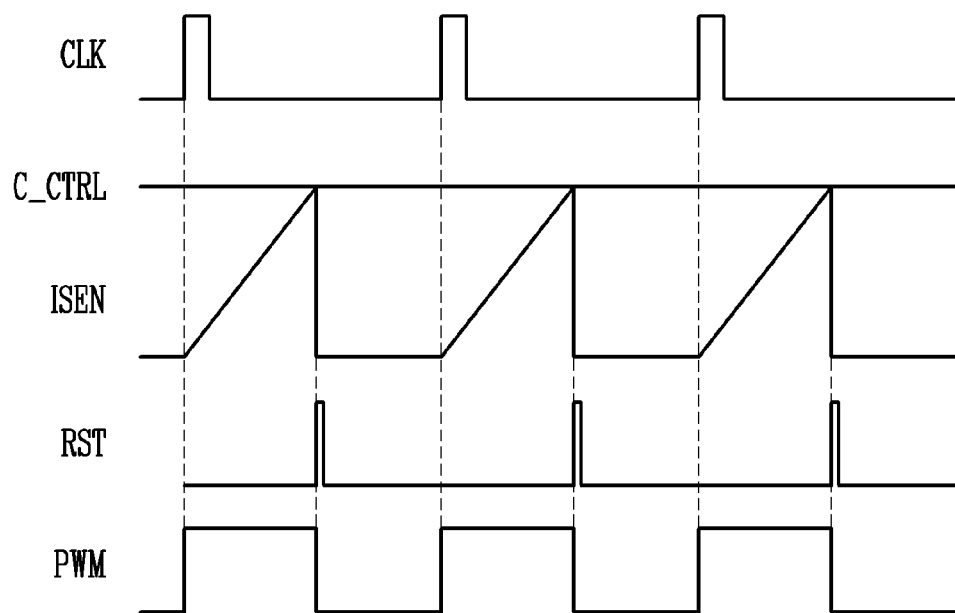
FIG. 18 is a timing diagram for explaining a first power source according to an embodiment of the present disclosure.

Referring to FIG. 18, the comparator 16114 outputs a reset signal RST when the sensed current ISEN reaches the compensation control voltage C_CTRL. The modulator 16115 generates a pulse of the PWM signal PWM when a clock signal CLK occurs, and terminates the pulse of the PWM signal PWM when the reset signal RST occurs. For example, the modulator 16115 may be an RS latch.

Figure 19:
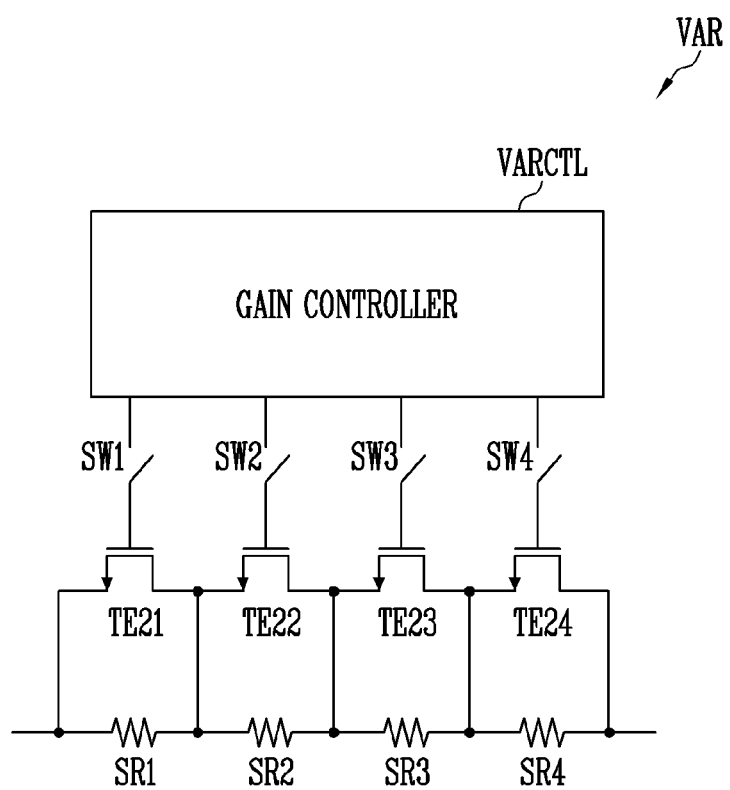
FIG. 19 is a circuit diagram for explaining a first power source according to an embodiment of the present disclosure.

As an example, FIG. 19 illustrates a structure of a variable resistor VAR. The variable resistor VAR may include a gain controller VARCTL, switches SW1, SW2, SW3, and SW4, transistors TE21, TE22, TE23, and TE24, and resistors SR1, SR2, SR3, and SR4.

For example, resistance values of the resistors SR1, SR2, SR3, and SR4 may be different from each other. The resistance value of the resistor SR1 may be the smallest, and the resistance value of the resistor SR4 may be the largest. The gain controller VARCTL may short-circuit the resistor SR4 by turning on the switch SW4 and the transistor TE24 when the load current is the largest. Accordingly, the gain controller VARCTL may control the resistance value of the variable resistor VAR to be the smallest when the load current is the largest. The gain controller VARCTL may short-circuit the resistor SR1 by turning on the switch SW1 and the transistor TE21 when the load current is the smallest. Accordingly, the gain controller VARCTL may control the resistance value of the variable resistor VAR to be the largest when the load current is the smallest.

Figure 20:
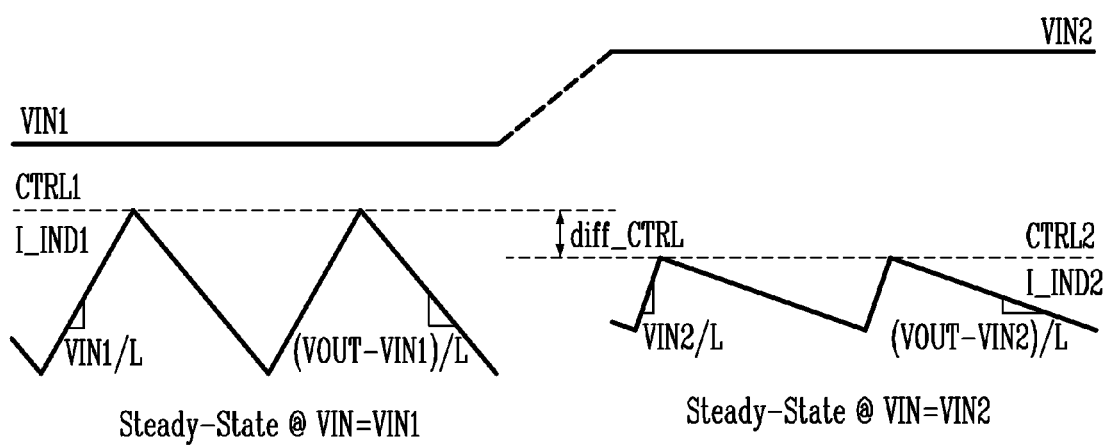
FIG. 20 is a timing diagram for explaining a first power source according to an embodiment of the present disclosure.

FIG. 20 illustrates a case in which an input voltage VIN increases from a low input voltage VIN1 to a high input voltage VIN2. In this case, since the feedback voltage FBV increases, the control voltage CTRL decreases from a high control voltage CTRL1 to a low control voltage CTRL2. A current I_IND1 of the inductor LX at the control voltage CTRL1 and a current I_IND2 of the inductor LX at the control voltage CTRL2 are exemplarily shown. L denotes inductance of the inductor LX, and VOUT denotes the voltage ELVDD.

Meanwhile, a rate at which the control voltage CTRL1 converges to the control voltage CTRL2 (e.g., a slew rate) affects ripple and settling time of the output voltage. Due to the limited gain (gm) and the configuration of the filter 16112, the slew rate of the control voltage CTRL may be limited. When TDMA is used, the ripple and settling time may increase.

According to the present embodiment, the amount of change in the control voltage CTRL according to the input voltage VIN is predicted by the compensator 16113, and the amount of change in the control voltage CTRL may be minimized by applying it as the compensation voltage V_VAR. For example, a voltage difference diff_CTRL may be minimized. Accordingly, it is possible to prevent performance degradation due to the limited slew rate.

While this invention has been described in connection with what are presently considered to be practical embodiments, it is to be understood that the claimed invention is not limited to the disclosed embodiments, but, on the contrary, is intended to cover various modifications and equivalent arrangements included within the spirit and scope of the appended claims. Therefore, those of ordinary skill in the pertinent art will understand that various modifications and other equivalent embodiments of the present disclosure are possible. Consequently, the true technical protective scope of the present disclosure is to be determined based on the technical spirit of the appended claims.

What is claimed is:

1. A voltage converter comprising:
   an inductor in which a first electrode thereof receives an input voltage and a second electrode thereof is connected to a first node;
   a first transistor in which a first electrode thereof is connected to the first node and a second electrode thereof is connected to a second node providing an output voltage;
   a second transistor in which a first electrode thereof is connected to the first node and a second electrode thereof is connected to a reference terminal; and
   a current sensor connected to the first node and the second node,
   wherein the current sensor includes:
   a third transistor in which a first electrode thereof is connected to the first node and a second electrode thereof is connected to a third node; and
   a current mirror circuit that mirrors currents flowing through the second node, the third node, and a sensing terminal.

2. The voltage converter of claim 1, wherein an area occupied by the third transistor is smaller than an area occupied by the first transistor.

3. The voltage converter of claim 1, wherein a gate electrode of the third transistor is connected to the reference terminal.

4. The voltage converter of claim 1, wherein the current mirror circuit includes:
   a fourth transistor in which a first electrode thereof is connected to the second node, a second electrode thereof is connected to a fourth node, and a gate electrode thereof is connected to the third node;
   a fifth transistor in which a first electrode thereof is connected to the third node, a second electrode thereof is connected to the fourth node, and a gate electrode thereof is connected to the third node; and
   a sixth transistor in which a first electrode thereof is connected to the sensing terminal, a second electrode thereof is connected to the fourth node, and a gate electrode thereof is connected to the third node.

5. The voltage converter of claim 1, further comprising:
   an auxiliary circuit connecting the second electrode of the third transistor to the third node and connecting the second node to a fifth node,
   wherein the current mirror circuit mirrors a current flowing between the third node and a fourth node, a current flowing between the fifth node and the fourth node, and a current flowing between the sensing terminal and the fourth node.

6. The voltage converter of claim 5, wherein
an area occupied by the third transistor is smaller than an area occupied by the first transistor.

7. The voltage converter of claim 5, wherein
a gate electrode of the third transistor is connected to the reference terminal.

8. The voltage converter of claim 5, wherein
the current mirror circuit includes:
a fourth transistor in which a first electrode thereof is connected to the fifth node, a second electrode thereof is connected to the fourth node, and a gate electrode thereof is connected to the third node;
a fifth transistor in which a first electrode thereof is connected to the third node, a second electrode thereof is connected to the fourth node, and a gate electrode thereof is connected to the third node; and
a sixth transistor in which a first electrode thereof is connected to the sensing terminal, a second electrode thereof is connected to the fourth node, and a gate electrode thereof is connected to the third node.

9. The voltage converter of claim 8, wherein
the auxiliary circuit includes:
a seventh transistor in which a first electrode thereof is connected to the second node, a second electrode thereof is connected to the fifth node, and a gate electrode thereof is connected to the fifth node; and
an eighth transistor in which a first electrode thereof is connected to the second electrode of the third transistor, a second electrode thereof is connected to the third node, and a gate electrode thereof is connected to the fifth node.

10. The voltage converter of claim 9, further comprising
a ninth transistor connected to the first transistor in parallel; and
a tenth transistor connected to the second transistor in parallel.

11. The voltage converter of claim 10, wherein
an area occupied by the ninth transistor is smaller than an area occupied by the first transistor, and
an area occupied by the tenth transistor is smaller than an area occupied by the second transistor.

12. The voltage converter of claim 5, further comprising
a multiplexer receiving a plurality of shut-down voltage levels and outputting one of the plurality of shut-down voltage levels as a reference voltage level;
a comparator that receives the reference voltage level through a first input terminal thereof and receives a sensing voltage corresponding to a current of the sensing terminal through a second input terminal thereof; and
a counter that provides a shut-down signal when an output of the comparator is within an effective output range for a predetermined time or more.

13. A display device comprising:
pixels commonly connected to a first power line;
a first voltage converter in which an output terminal thereof is connected to the first power line; and
a second voltage converter in which an output terminal thereof is connected to the first power line,
wherein when a first power current flowing through the first power line is less than a reference current, the first voltage converter individually generates the first power current, and
when the first power current is larger than the reference current, the first voltage converter and the second voltage converter jointly generate the first power current.

14. The display device of claim 13, wherein
the first voltage converter includes:
an inductor in which a first electrode thereof receives an input voltage and a second electrode thereof is connected to a first node;
a first transistor in which a first electrode thereof is connected to the first node and a second electrode thereof is connected to a second node providing an output voltage;
a second transistor in which a first electrode thereof is connected to the first node and a second electrode thereof is connected to a reference terminal; and
a current sensor connected to the first node and the second node, and
the current sensor includes:
a third transistor in which a first electrode thereof is connected to the first node and a second electrode thereof is connected to a third node; and
a current mirror circuit that mirrors currents flowing through the second node, the third node, and a sensing terminal.

15. The display device of claim 14, wherein
an area occupied by the third transistor is smaller than an area occupied by the first transistor.

16. The display device of claim 14, wherein
a gate electrode of the third transistor is connected to the reference terminal, and
the current mirror circuit includes:
a fourth transistor in which a first electrode thereof is connected to the second node, a second electrode thereof is connected to a fourth node, and a gate electrode thereof is connected to the third node;
a fifth transistor in which a first electrode thereof is connected to the third node, a second electrode thereof is connected to the fourth node, and a gate electrode thereof is connected to the third node; and
a sixth transistor in which a first electrode thereof is connected to the sensing terminal, a second electrode thereof is connected to the fourth node, and a gate electrode thereof is connected to the third node.

17. The display device of claim 13, wherein
the first voltage converter includes:
an inductor in which a first electrode thereof receives an input voltage and a second electrode thereof is connected to a first node;
a first transistor in which a first electrode thereof is connected to the first node and a second electrode thereof is connected to a second node providing an output voltage;
a second transistor in which a first electrode thereof is connected to the first node and a second electrode thereof is connected to a reference terminal; and
a first current sensor connected to the first node and the second node, and
the current sensor includes:
a third transistor including a first electrode connected to the first node and a second electrode;
a current mirror circuit that mirrors a current flowing between a third node and a fourth node, a current flowing between a fifth node and the fourth node, and a current flowing between a sensing terminal and the fourth node; and
an auxiliary circuit connecting the second node and the fifth node and connecting the second electrode of the third transistor to the third node.

18. The display device of claim 17, wherein
an area occupied by the third transistor is smaller than an area occupied by the first transistor.

19. The display device of claim 17, wherein
a gate electrode of the third transistor is connected to the reference terminal, and the current mirror circuit includes:

a fourth transistor in which a first electrode thereof is connected to the fifth node, a second electrode thereof is connected to the fourth node, and a gate electrode thereof is connected to the third node;

a fifth transistor in which a first electrode thereof is connected to the third node, a second electrode thereof is connected to the fourth node, and a gate electrode thereof is connected to the third node; and a sixth transistor in which a first electrode thereof is connected to the sensing terminal, a second electrode thereof is connected to the fourth node, and a gate electrode thereof is connected to the third node.

20. The display device of claim 19, wherein
the auxiliary circuit includes:

a seventh transistor in which a first electrode thereof is connected to the second node, a second electrode thereof is connected to the fifth node, and a gate electrode thereof is connected to the fifth node; and an eighth transistor in which a first electrode thereof is connected to the second electrode of the third transistor, a second electrode thereof is connected to the third node, and a gate electrode thereof is connected to the fifth node.

\* \* \* \* \*